(12) United States Patent
Dombroski et al.

(10) Patent No.: US 9,551,388 B2
(45) Date of Patent: Jan. 24, 2017

(54) DISK BRAKE CALIPER ASSEMBLY

(71) Applicants: Henry Dombroski, Boynton Beach, FL (US); Anthony Cunningham, Boynton Beach, FL (US)

(72) Inventors: Henry Dombroski, Boynton Beach, FL (US); Anthony Cunningham, Boynton Beach, FL (US)

(*) Notice: Subject to any disclaimer, the term of this patent is extended or adjusted under 35 U.S.C. 154(b) by 53 days.

(21) Appl. No.: 14/554,910

(22) Filed: Nov. 26, 2014

(65) Prior Publication Data

US 2016/0146277 A1 May 26, 2016

(51) Int. Cl.
*F16D 55/18* (2006.01)
*F16D 65/00* (2006.01)
*F16D 125/04* (2012.01)
*F16D 125/08* (2012.01)

(52) U.S. Cl.
CPC ....... *F16D 65/0068* (2013.01); *F16D 2125/04* (2013.01); *F16D 2125/08* (2013.01)

(58) Field of Classification Search
CPC ...... F16D 65/18; F16D 65/14; F16D 65/0068; F16D 2125/04; F16D 2125/08; F16J 3/043; F16J 10/02
USPC .... 188/72.4, 71.8, 72.1, 72.5, 370; 277/357, 277/380, 434, 437, 445, 447, 466; 92/165 R, 168
See application file for complete search history.

(56) References Cited

U.S. PATENT DOCUMENTS

| | | | |
|---|---|---|---|
| 3,476,221 A | 11/1969 | Schanz | |
| 3,478,650 A | 11/1969 | Schrader | |
| 3,490,343 A | 1/1970 | Afanador et al. | |
| 3,631,767 A | 1/1972 | Meier | |
| 4,039,053 A | 8/1977 | Meyer et al. | |
| 4,503,947 A | 3/1985 | Heidmann et al. | |
| 4,809,821 A * | 3/1989 | Fulmer | F16D 65/18 188/370 |
| 7,097,004 B2 | 8/2006 | Barrett et al. | |
| 7,125,084 B2 | 10/2006 | Dombrowski et al. | |
| 7,185,955 B2 | 3/2007 | Dombroski | |
| 7,226,133 B2 | 6/2007 | Dombroski et al. | |
| 7,740,036 B2 | 6/2010 | Dombroski et al. | |
| 7,905,336 B2 * | 3/2011 | Cortinovis | F16J 3/043 188/370 |
| 2013/0192936 A1 | 8/2013 | Scotti et al. | |

* cited by examiner

*Primary Examiner* — Pamela Rodriguez
(74) *Attorney, Agent, or Firm* — McHale & Slavin, P.A.

(57) ABSTRACT

Disclosed is a disk brake caliper assembly where a second seal is positioned in a second annular groove to eliminate the seizure of the piston cylinder that commonly occurs on trailer brakes that are immersed in water. The second seal is slightly deformable and designed to frictionally engage the piston. The second seal functions as both a wiper to keep dirt and contaminants out of the cylinder assembly and to prevent water ingress. The use of the secondary seal can compliment or eliminate the need for a dust boot.

12 Claims, 5 Drawing Sheets

DISK BRAKE CALIPER ASSEMBLY

FIELD OF THE INVENTION

The invention is related to the field of disk brakes and in particular to a seal design and configuration in a disk brake caliper for prevention of brake seizure and premature brake wear that is common on boat trailers.

BACKGROUND OF THE INVENTION

Applicant has uncovered and addressed in prior art patents a significant problem in the construction of a disk brake caliper that can be submerged, see U.S. Pat. Nos. 7,125,084; 7,185,955; 7,226,133; 7,740,036 and other patents pending. By way of background, a conventional boat trailer utilizes a fixed axle secured to a trailer frame. A wheel assembly is coupled to the axle by use of a wheel hub. The wheel hub employs bearings, namely inner and outer bearings with an associated inner and outer race, which permits rotational movement in relation to the axle. Proper lubrication of the bearings is critical in controlling heat and premature bearing wear. Larger trailers require a braking system which can further add to the heat buildup.

Problems with the wheel assembly are pronounced with the trailers are placed in water, such as when loading or unloading a boat. The heat build-up during normal operation of the trailer (i.e. bearing rotation and brake application) can result in the brake hubs heating up to a temperature that no coating can be applied. This is especially true of disk brakes wherein the disk brake caliper is made of conventional steel. Such disk brake calipers, when subjected to an immediate quenching after trailering, can quickly corrode. Further, the cylinder wall holding the piston and brake pad against the rotor can quickly corrode. The result is a dragging brake which creates a high heat problem, which can not only affect the life of the bearings and brakes, but can lead to a dangerous condition wherein either the bearings break down or the rotor heats up so much that the brakes will not work. While calipers made from high quality stainless steel can be used to lessen corrosion, it is prohibitively expensive for the average consumer. Further even if the piston is made of high quality stainless steel, and the caliper made of high quality steel, corrosion around the piston on the cylinder wall will result in brake dragging.

The problem to be addressed occurs when a conventional brake caliper is left in the elements to corrode, or is subjected to salt water immersion which expedites such corrosion. Corrosion of the piston and cylinder in the disk caliper can induce a very high frictional load and, in a worse case scenario can literally freeze the piston and brake pad in a fixed position and lock the rotor in position. Brake dragging is common and leads to the red hot glowing hubs that can be seen at night as an unsuspecting vehicle operator is pulling an affected trailer. Should the bearing fail, the bearing and race will typically disintegrate with a likely result of the hub and wheel detaching from the axle of the trailer. Another scenario that happens is the brake caliper's piston will not retract due to the corrosion creep around the piston's cylinder wall and the brake pads lock onto the rotor and wheel to where the tire drags and causes flat spots or wear through the tire entirely causing the tire to become flat.

Attempts to prevent corrosion of the piston and cylinder walls include the use of a dust boot and sealing rings in an effort to protect the brake piston cylinder assemblies from contamination and corrosion. However, these devices can actually trap moisture within leading to premature failures. Boat trailers present an excellent example of premature rotor wear as a boat trailer must be inserted into the water for loading or unloading of the boat which can quickly lead to a locking of the brake piston.

U.S. Patent Application 2013/0192936 to Scotti, et al., discloses a flexible sheathing for the protection of piston-cylinder units for disk brakes. Such flexible sheathing may be arranged in a retracted condition wherein the piston is completely accommodated within the cylinder and in an extended condition wherein the piston is completely extracted from a caliper body defining the cylinder.

U.S. Pat. No. 7,097,004 to Barrett, et al., discloses a boot-type seal having a seal and a valve. The seal has a first seal member, which is configured to sealingly engage a first surface, and a second seal member, which is configured to sealingly engage a second surface.

U.S. Pat. No. 4,503,947 to Heidmann, et al., discloses the open bore of a disc brake caliper assembly is protected by a resilient boot and retainer assembly. The piston which forces the friction elements against the friction faces of the rotor is provided with a circumferentially extending groove which receives the bead circumscribing one end of the boot. The bead circumscribing the other end of the boot is clamped against a land of the piston by a boot retainer.

U.S. Pat. No. 4,039,053 to Meyer, et al., discloses in a disk brake in which a moveable member is slidably mounted on a fixed support member by means of at least one column at least one protecting device is associated to each column to prevent various particles such as mud, grease, and the like to be deposited on the sliding surfaces of the column. The protecting device includes a seal of resilient material which cooperates with the outside surface of the column by means of at least one lip, and which carries a rigid scraper element level with the outside surface of the column. The scraper element is mounted outside with respect to the lip of the seal to clean off the particles of solid materials in a first stage, the liquid particles being retained by the lip in a second stage.

U.S. Pat. No. 3,631,767 to Meier, discloses a disk brake wheel cylinder in which the open end of the cylinder is protected by a wear and corrosion resistant insert in the form of a collar which is retained by a groove in the wall of the cylinder.

U.S. Pat. No. 3,476,221 to Schanz, discloses a piston cylinder assembly with seal means and corrosion preventing means.

U.S. Pat. No. 3,478,650 to Schrader, et al., discloses in a piston and cylinder assembly for an automotive spot-type disk brake a recess is provided in the wall of the cylinder bore for the deposition of particles detached from the dust cap and the packing material, to prevent the agglomeration of such matter in the space between the piston and the cylinder wall where it is apt to interfere with trouble free piston motion.

U.S. Pat. No. 3,490,343 to Afanador, et al., discloses a combined piston boot seal and wiper encircles the hydraulic cylinder in a disk brake and includes an integral wiper which rides on the outer surface of the piston inwardly of a bellows type boot seal providing dual protection for the piston surface and for the cylinder bore from road hazards, contamination and the like.

Presently there lacks a disk brake caliper assembly that is designed to address anticipated brake piston corrosion of trailers used in harsh corrosive environments.

SUMMARY OF THE INVENTION

Disclosed is a disk brake caliper assembly for use on boat trailers where a secondary seal is strategically positioned in an annular groove adjacent a primary brake fluid seal. The secondary seal permits the reduction of a land and prevents corrosion from reaching the primary seal. The second seal is slightly deformable and designed to frictionally engage the piston functioning as both a wiper and water ingress preventer. By use of the secondary seal, the caliper can be machined with tighter tolerance between the piston and the cylinder wall so that when corrosion does occur, the corrosion is unable to affect brake operation. The secondary seal also eliminates the need for a dust boot and associated area that can trap water.

Accordingly, it is an objective of the instant invention to eliminate brake seizure of a conventional disk brake caliper assembly commonly used on boat trailers used in saltwater operations.

It is yet another objective of the instant invention to prevent water ingress into the brake caliper assembly when a boat trailer is immersed into water while the brake assembly is heated from the trailing operation.

It is a still further objective of the invention to prevent creep of corrosion in the caliper housing of a brake assembly subjected to environmental conditions that promote corrosion.

It is a further objective of the instant invention to compliment or eliminate use of a conventional dust boot on a disk brake assembly.

Yet still another objective of the invention is to provide a method of modifying a conventional disk brake assembly to eliminate brake seizure.

An advantage of this improvement is the continued use of conventional low grade steel is possible wherein modification is minimal by way of including a secondary groove/seal and removal of a land section.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
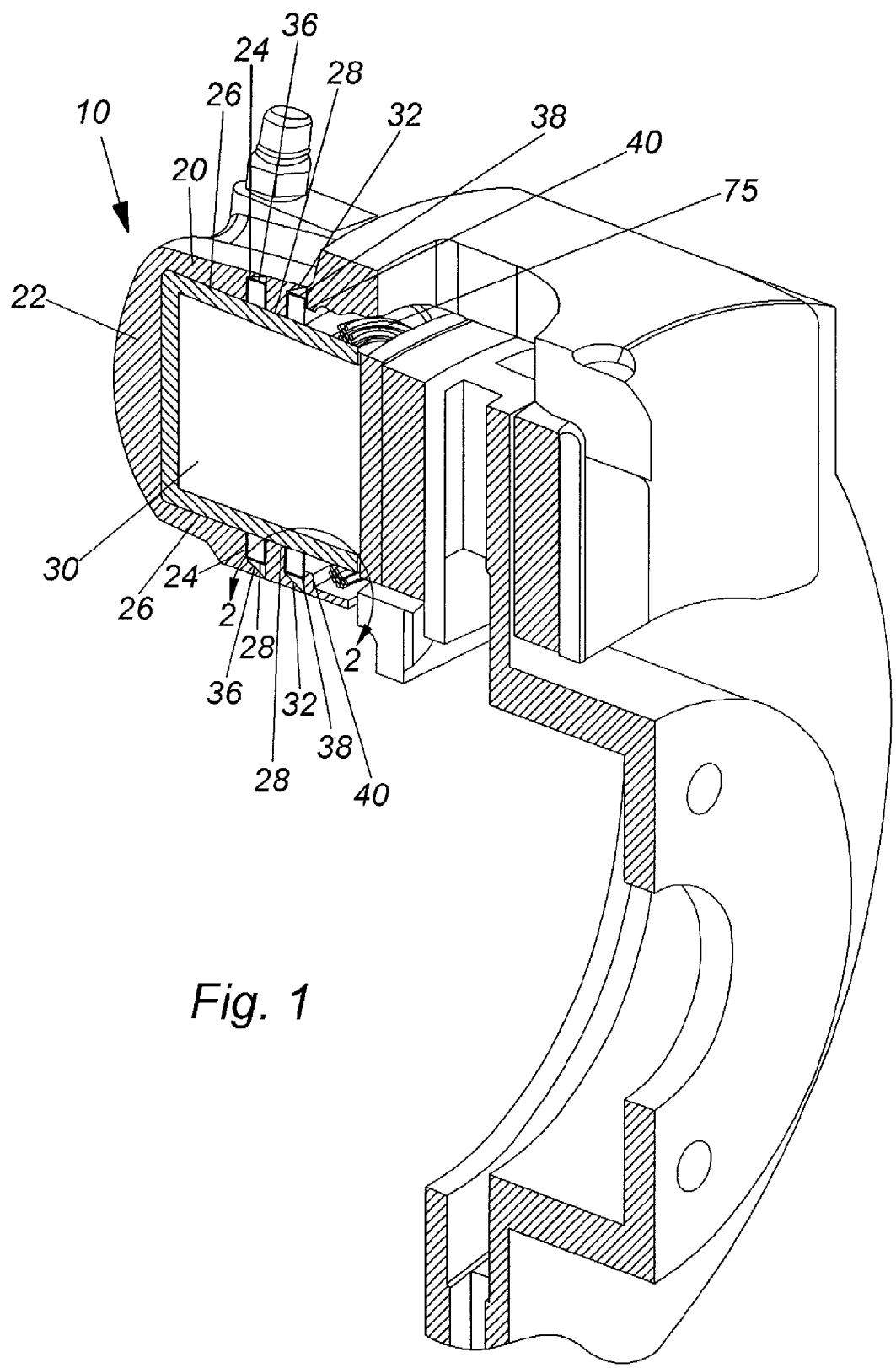
FIG. 1 is a cross sectional perspective view of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
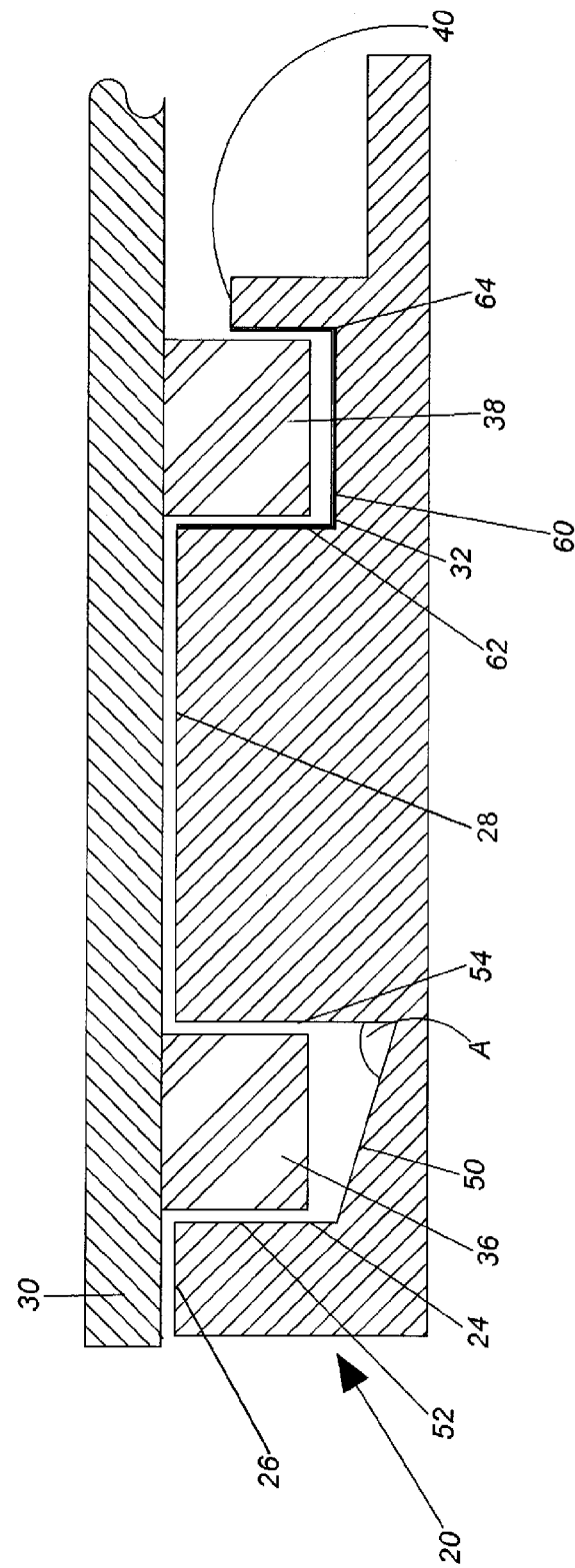
FIG. 2 is cross section view of FIG. 1 taken along lines 2, 2.
Figure 3:
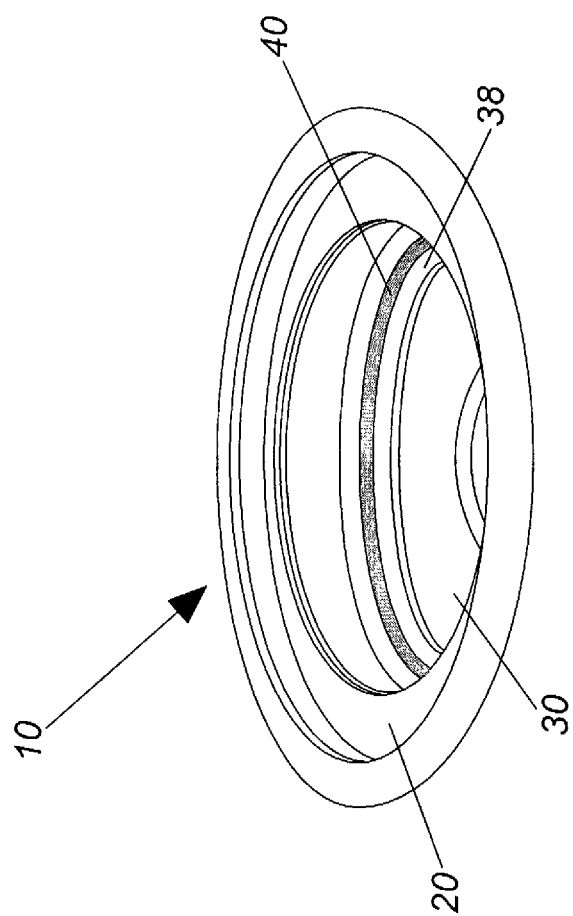
FIG. 3 is a top perspective view.
Figure 4:
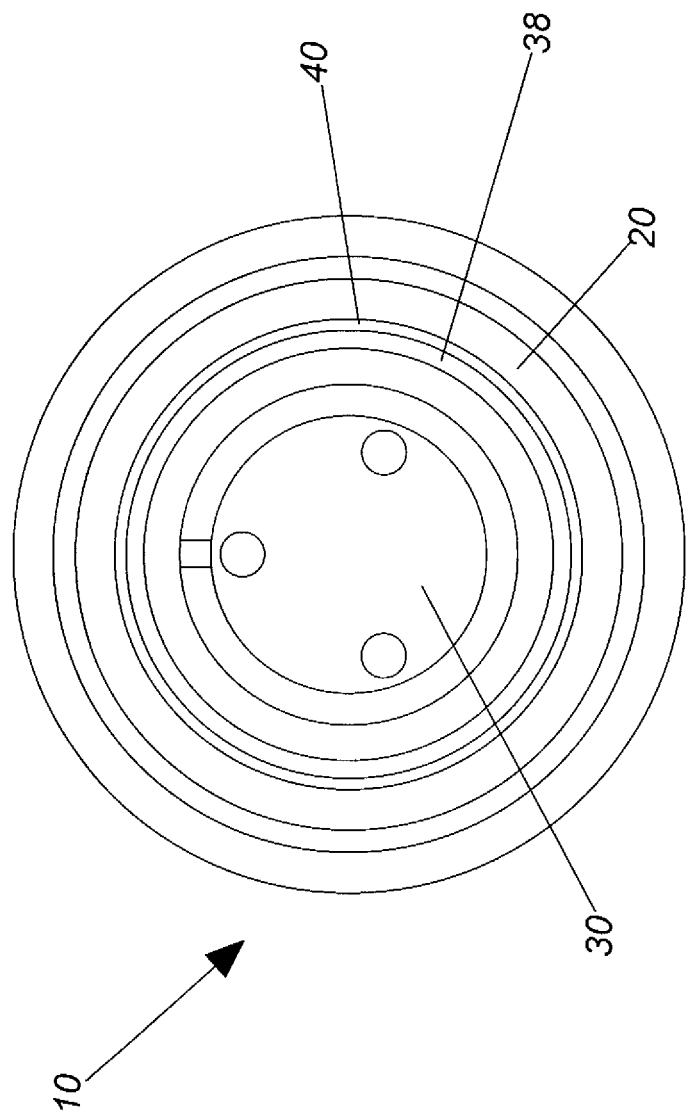
FIG. 4 is a top perspective view of the present invention.
Figure 5:
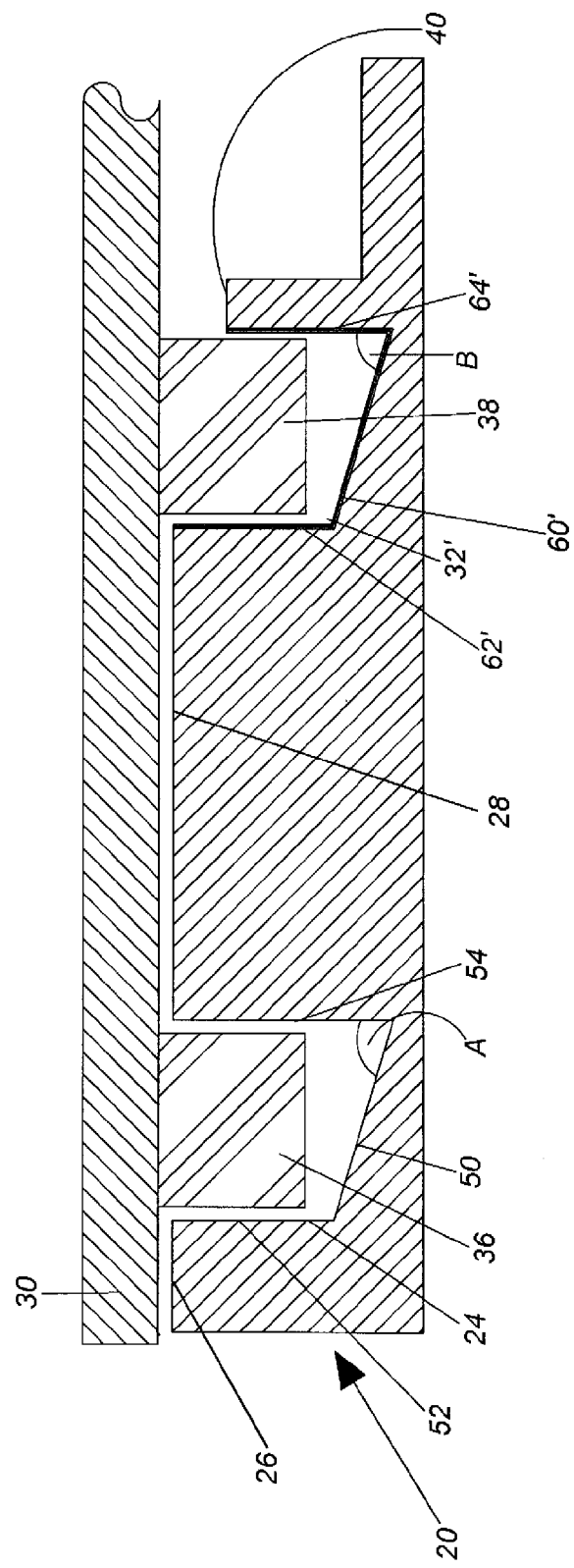
FIG. 5 is a cross sectional view of an alternative embodiment.

FIGS. 1-5, which are now referenced, with like elements numbered consistently throughout, illustrate the present invention. Disclosed is an improved disk brake assembly defined by a housing 10 with a cylinder bore 20 formed by a continuous sidewall 22 with a piston 30 that is axially moveable within the bore. The continuous sidewall has a first annular groove 24 that divides the continuous sidewall into a first land surface 26 and a second land surface 28. The first annular groove 24 is constructed and arranged to cooperate with a first sealing ring 36 positioned within the first annular groove 24 to frictionally engage the piston 30. The first land surface 26 and the second land surface 28 are positioned at a distance from the piston forming a first diameter.

The improvement to the disk brake caliper assembly comprises a second annular groove 32 positioned in the second land surface at a predetermined distance from the first annular groove 24 and extends around the continuous sidewall. The second annular groove 32 is constructed and arranged to cooperate with a second sealing ring 38 to frictionally engage the piston 30. The second annular groove 32 divides the second land surface 28 from a third land surface 40. The third land surface 40 defines a second diameter greater than the first diameter. The improvement spaces the third land surface 40 at a distance sufficient to prevent degradation of the third land from seizing the piston. The spacing of the third land surface prevents any corrosion buildup from affecting the operation of the brake. In this manner, should corrosion occur between the third land and the piston, the corrosion will not be strong enough to interfere with the operation of the piston. Whereas a conventional brake system has a very close tolerance where the third land is defined, the corrosion buildup in a close tolerance can literally weld the piston to the brake caliper.

In a preferred embodiment, the first land 26 is spaced from said piston at a distance approximately four and one half thousandths of an inch (0.0045 inches). The second land 28 distance is equal to the first land 26 distance. The third land 40 is positioned about 0.030 inches from said piston. The third land 40 is positioned at the predetermined distance from the piston so that rust or corrosion is unable to seize the land and the piston.

In one embodiment, the first 36 and second 38 sealing rings are designed to be interchangeable. The first and second sealing rings are a suitable dynamic seals compatible with brake fluid at pressures up to 2000 psi. The sealing rings are constructed of an elastomeric material, such as but not limited to for example, ethylene propylene, styrene butadiene, Teflon and butul.

The first seal 36 is the primary seal and may also include a retraction feature. The first annular groove is machined and is defined as having a bottom surface 50 and two side surfaces 52, 54 thereby creating a predetermined depth. The bottom surface 50 is constructed and arranged at a predetermined angle A to allow the first sealing ring 36 to twist as the piston extends. As the pressure is removed, the twisted seal relaxes and retracts the piston slightly so the brake pads have extra relief from the rotor.

The second annular groove 32 is further defined by a bottom surface 60 and two side surfaces 62, 64 machined to create a predetermined depth. The bottom surface 60 and two side surfaces 62, 64 are constructed and arranged to prevent movement of the second sealing ring within the second annular groove. The second annular groove 32 is machined straight so that it doesn't cause retraction but functions as a wiper. The second sealing ring 38 is constructed and arranged for minimum drag but maximum wiper seal effect.

In another embodiment, the second annular groove is machined and is defined as having a bottom surface 60' and two side surfaces 62', 64' thereby creating a predetermined depth. The bottom surface 60' is constructed and arranged at a predetermined angle B to allow the second sealing ring 38 to twist as the piston extends. As the pressure is removed, the twisted seal relaxes and retracts the piston slightly so the brake pads have extra relief from the rotor. In this embodiment, the second sealing ring 38 functions as both a wiper and a seal.

In a preferred embodiment, the second annular groove 32 is positioned approximately forty thousandths of an inch (0.040 inch) from the end of the cylinder. The cylinder is cut back away from the piston about thirty thousandths of an inch (0.030 inches) so that rust cannot bridge over the piston. The second land surface is approximately ninety thousandths of an inch (0.090 inch) long spacing the second seal 38 which functions as a wiper seal from the first seal 36 which is the primary seal. The wiper seal is constructed and arranged to prevent contamination of the second land surface.

A conventional disk brake assembly can be defined by a housing with a cylinder bore formed by a continuous sidewall with a piston axially moveable within the bore. The continuous sidewall having a first annular groove dividing the continuous sidewall into a first land surface and a second land surface to cooperate with a first sealing ring positioned within the first annular groove to frictionally engage the piston. The first land surface and the second land surface are positioned at a distance from the piston forming a first diameter.

The improvement to the conventional disk brake assembly comprises a second annular groove positioned in the second land surface at a predetermined distance from the first annular groove and extending around the continuous sidewall to cooperate with a second sealing ring to frictionally engage the piston. The second annular groove dividing the second land surface from a third land surface. The third land surface defining a second diameter greater than the first diameter. The result is a spacing of the third land at a distance sufficient to prevent any corrosion of the third land from seizing the piston.

The above disclosed invention is designed to eliminate the dust boot 75 in any conventional disk brake assembly. The improvement can be implemented with cast iron, stainless steel, aluminum or any other suitable brake caliper assembly materials. However, the improved disk brake assembly will allow for the dust boot 75 to be used without affecting the piston when corrosion creeps in the caliper body.

While the disk brake assembly can be manufactured in accordance with the above modifications, an existing disk brake assembly can be modified after manufacturing by: forming a second annular groove having a depth positioned in a second land surface at a predetermined distance from said first annular groove and extending around said continuous sidewall; removing a portion of said third land surface, said third land surface defining a second diameter greater than said first diameter, said third land spaced apart from said piston at a distance sufficient to eliminate the piston from seizing the land; and inserting a second sealing ring within said second annular groove, said second sealing ring constructed and arranged to frictionally engage said piston creating a seal between said land surface and said piston.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and/are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A disk brake assembly that eliminates brake seizure due to corrosion, said disk brake assembly defined by a housing with a cylinder bore formed by a continuous sidewall with a piston axially moveable within said bore; said continuous sidewall having a first annular groove dividing said continuous sidewall into a first land surface and a second land surface constructed and arranged to cooperate with a first sealing ring positioned within said first annular groove to frictionally engage said piston, said first land surface and said second land surface positioned at a distance from said piston forming a first diameter, the improvement comprising:
    a second annular groove having a depth positioned in said second land surface at a predetermined distance from said first annular groove and extending around said continuous sidewall,
    a second sealing ring positioned within said second annular groove and constructed and arranged to frictionally engage said piston creating a seal between said second land surface and said piston, said second sealing ring is interchangeable with said first sealing ring;
    said second annular groove dividing said second land surface from a third land surface positioned at a distance from the piston, said third land surface defining a second diameter greater than said first diameter; said third land spaced apart from said piston at a distance sufficient to eliminate the need for a sealed boot to prevent the piston from seizing the housing.

2. The disk brake assembly of claim 1, wherein said first land is spaced from said piston at a distance approximately four and a half thousandths of an inch.

3. The disk brake assembly of claim 1, wherein said second land distance to said piston is equal to said first land distance to said piston.

4. The disk brake assembly of claim 1, wherein said third land is spaced apart from said piston at a distance greater than said second land distance to said piston, whereby rust or corrosion is unable to effectively seize said third land to said piston.

5. The disk brake assembly of claim 4, wherein a portion of said third land is positioned about thirty thousandths of an inch from said piston.

6. The disk brake assembly of claim 4 wherein a portion of said third land is positioned about thirty thousandths of an inch from said piston and the remainder of said third land is spaced apart from said piston at a distance equal to or exceeding the depth of said second annular groove.

7. The disk brake assembly of claim 1, wherein said second sealing ring is an elastomeric compound compatible with brake fluid.

8. The disk brake assembly of claim 1, wherein said bottom surface of said first annular groove is angled allowing said first sealing ring to deform as said piston is extended.

9. The disk brake assembly of claim 1, wherein said bottom surface is angled to prevent movement of said sealing ring within said second annular groove whereby said second sealing ring functions as a wiper seal.

10. The disk brake assembly of claim 1 wherein said second sealing ring is constructed and arranged to operate as a wiper seal with minimum frictional drag placed upon said piston.

11. The disk brake assembly of claim 1, wherein said second annular groove is positioned about forty thousandths of an inch from an end of said cylinder.

12. The disk brake assembly of claim 1, wherein said second land surface is about ninety thousandths of an inch long.

* * * * *